United States Patent
Alvarez

[11] Patent Number: 5,806,830
[45] Date of Patent: Sep. 15, 1998

[54] PLASTIC TAKE-OFF COLLAR FOR SUPPLY DUCT

[76] Inventor: Luis Jullian Alvarez, 9 Carteret Dr., Pomona, N.Y. 10970

[21] Appl. No.: 900,277
[22] Filed: Jul. 25, 1997
[51] Int. Cl.$^6$ ........................................................ F16K 1/22
[52] U.S. Cl. .............................................. 251/145; 251/306
[58] Field of Search ..................................... 251/145, 148, 251/305, 306

[56] References Cited

U.S. PATENT DOCUMENTS

| | | | |
|---|---|---|---|
| 3,941,151 | 3/1976 | Biddler | 251/306 X |
| 4,335,738 | 6/1982 | Nassir | 251/305 X |
| 5,370,360 | 12/1994 | Buchley | 251/305 |

Primary Examiner—John Fox
Attorney, Agent, or Firm—Richard T. Holzmann

[57] ABSTRACT

A molded plastic take-off collar for joining main and branch ducts in forced air heating, cooling, exhaust and ventilation systems having a tubular member with a first end perpendicular flange, and a second end having gripping beads and a stopping edge for attachment to a branch duct. Molded strengthening ribs are formed at the external intersection of the tube and flange; while truncated rims are formed extending from the inner walls of the tube to positively seat a damper flap wherein opposite sides have two protruding threaded pivot pins, which flap can be flexed for insertion of the pins into two opposite openings in the wall of the tube. The damper flap is a unitary structure with the molded pins and molded strengthening beads therefor. A handle and wing nut are provided for positioning the flap. A flexible double-sided adhesive covered ring facilitates joining of the take-off collar to the main duct.

8 Claims, 3 Drawing Sheets

PLASTIC TAKE-OFF COLLAR FOR SUPPLY DUCT

FIELD OF THE INVENTION

This invention relates to a take-off collar and an air volume control damper for attachment to an air duct and more particularly to one which is more energy, labor and cost efficient.

BACKGROUND

In the construction of central heating, air conditioning, ventilation, exhaust and return systems, a network of ducts is extended from a central source of heated or cooled air into the various rooms for discharging the heated or cooled air into the rooms. The type of available air duct which is extensively used is metallic, usually galvanized sheet metal. Generally, the ducting is of cylindrical configuration with fittings, such as elbows, tees, couplings, etc., being used to join the fittings together for the desired ducting layout. Other types reported in the literature have some of their components manufactured of non-metallic components usually of molded plastic.

The transfer of forced air from the heating or cooling unit to remote areas of the structure being heated or cooled is normally inefficient. A primary reason for such inefficiency is leakage at the connection between main system components and branch system components. However, there are a number of other points of leakage within the collar itself such as the space between the damper, or flap, and the inside of the tubing; the space between the flange and the one end of the tubing; as well as the space between the tubular end opposite the flange end and the connecting tubing, etc. Most of these weaknesses are inherent in the nature of the materials used resulting form the working of sheet metal or sheet metal/plastic fabrication techniques.

Another problem associated with the prior art is the inherent weakness of a number of the sheet metal components (for example, the flanges used are flimsy), their interconnections, and even the crimping to form vertical ribs or creases to allowing fitting to other components; all of these weaken the structure.

Buckley discloses in U.S. Pat. No. 5,370,360 a unitary bellmouth duct fitting having a tubular body portion, having a height of six inches, and a bellmouth portion; the tubular body portion has a circumferential terminal edge from which the bellmouth portion or flange radially and integrally extends and the bellmouth portion merges with the tubular portion to provide a less than two inch radius.

It is not known from this disclosure which materials or which processes may be used to manufacture this fitting. Were a metallic material employed, the bellmouth portion would probably have to be spun from a metal tube resulting in this portion being considerably thinner and weaker than the tubular portion. Were a plastic material used, reinforcement of the juncture between the two portions would be recommended for maximum strength and optimum performance.

In heating, ventilating and air conditioning systems using a network of ducts to distribute from a central source to various separated locations, the optimum location of the air volume control dampers along such ducts cannot be easily determined in advance of actual installation. For that reason, the dampers must be so structured that they can be installed in the ducts in the field after the ducts have been formed. This ability to be field installed to pivot on axes normal to the longitudinal axes of ducts having cylindrical sheet metal walls is a prerequisite of substantially all of the prior art structures.

With respect to dampers in conventional use, U.S. Pat. No. 4,715,581 issued to Myers is typical. Myers teaches a damper which when inserted into the duct, a first fixed pivot pin is popped into a first opening in one side of the duct, while a second pivot pin opposite the first is aligned with the opposite opening in the duct. Thereafter, a guide finger is released and the second pivot pin extends through the opposite opening under the urging of a spring. This damper has a number of separate elements making its assembly parts- and labor-intensive and contributing substantially to cost.

Alternatively, another but less expensive and simpler conventional sheet metal damper having fixed pivot pins at both ends can be bent and popped into both openings resulting in a permanent curvature of the damper and increasing air leakage past the damper plate.

In order to obtain precision, it has been customary to cut out damper blades using a circular shear. This is a labor intensive and time consuming practice where production of relatively large numbers of dampers are required.

What was needed before the present invention was a circular damper which was inexpensively made, but precision made to be easily fitted into a cylindrical duct and to be pivoted on diametrically opposite sides thereof in the duct. Such a damper should not vibrate in the duct regardless of its positioning and regardless of the velocity of the air flow through the duct. It should be producible in substantial quantities at extremely low prices. Although the damper blade disclosed herein is circular, the invention is equally applicable to blades of other shapes such as rectangular, oval, etc.

Still another problem with metallic fittings is that they are prone to rusting as a result of moisture, and even allergies and Legionnaire's disease. Non-metallic fittings of the subject invention are not susceptible to such problems.

In the context of this known technology, there remains the need for a connecting component for joining together a main and a branch duct in a forced air heating and/or cooling system which is of simple construction and installation, is energy-saving, and is relatively inexpensive in volume production. The take-off collar and damper of the present invention fulfill these objectives.

SUMMARY OF THE INVENTION

According to the teaching of the present invention, a take-off collar for joining together a main and a branch duct in a forced air heating, cooling, exhaust and return system comprises: an integrated connecting component further comprising: a molded elongated plastic tubular member having a passageway and having a first end with an outwardly extending continuous peripheral flange portion perpendicular to the direction of elongation of the tubular member and having a molded peripheral bead for stiffening, the flange having therein a plurality of openings extending therethrough generally parallel to the direction of elongation of the tubular member and adapted to have fastening members pass therethrough for connecting to the main duct, and a second end having gripping beads and a stopping edge externally therearound adapted to receive the branch duct; a plurality of molded ribs formed at the external junction of the tubular member and the flange for reinforcement and strengthening thereof; a pair of top and bottom interior, annular, truncated rim members molded perpendicularly in the passageway for seating and stopping rotation of a damper, horizontally displaced from one another for allowing the damper to seat on the top of one rim and the bottom of the other and further having space therebetween to accommodate fixtures of the damper; and the tubular member has a first through aperture formed therein spaced from both ends thereof, a second through aperture is formed in the tubular member on the same horizontal plane as the first aperture and opposite therefrom and situated therebetween the truncated rim members.

The take-off collar of claim 1 further comprising a separate ring of flexible material having adhesive on both sides thereof for bonding to the flange and the main duct for joining together the integrated connecting component and the main duct, and the ring having openings therein registered with the openings of the flange adapted to have the fastening members pass therethrough. The ring of claim 2 wherein the flexible material is selected from the group consisting of foam tape, rubber and tacky cork.

The take-off collar of claim 1 wherein the damper further comprises: a generally flat molded flexible flap having an outer periphery generally congruent with the inner periphery of the tubular member on a plane normal to the longitudinal axis of the tubular member; a pair of protruding threaded pivot pins molded to the flexible flap, having integrally molded reinforcements therefor, the flap pivotable about a horizontal axis of the tubular member of the take-off collar, a first pivot pin having been inserted into the first through aperture formed therein spaced from ends of the tubular member, and the flap having been flexed, a second pivot pin being inserted into a second through aperture formed in the tubular member on the same horizontal plane as the first aperture and opposite thereto, the apertures being positioned to allow placement of the pivot pins therein; a handle with an opening therein for placement on either one of the pivot pins for moving the flap; and a wing nut screwed onto the pivot pin having the handle thereon, for locking and unlocking the flap in place to control air flow. The integrated connecting component of claim 1 wherein the moldable material of construction is selected from the group consisting of moldable plastics and fiberglass reinforced plastics. The integrated connecting component of claim 1 wherein the annular rim members are of a minimum width to insure maximum uninterrupted air flow while adequately stopping rotation of the damper. The integrated connecting component of claim 1 wherein the outwardly extending continuous peripheral flange portion is not exactly perpendicular to the direction of elongation of the tubular member, having a radius of curvature sufficient to optimize air flow.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The focus of the present invention is on a one-piece integrally molded take-off collar for joining a forced air heating and/or cooling system main duct with a branch duct. It is designed so that it can be operated with or without a damper, which damper is a separate element capable of very simple installation; so simple that it can be merely popped into place.

Even today, the majority of conventional junctions for this purpose are of sheet metal construction due to considerations of material and labor costs. Yet, sheet metal cannot be worked to optimize energy conservation, ease of fabrication and therefore savings in labor, as well as strength and integrity of construction.

Figure 1:
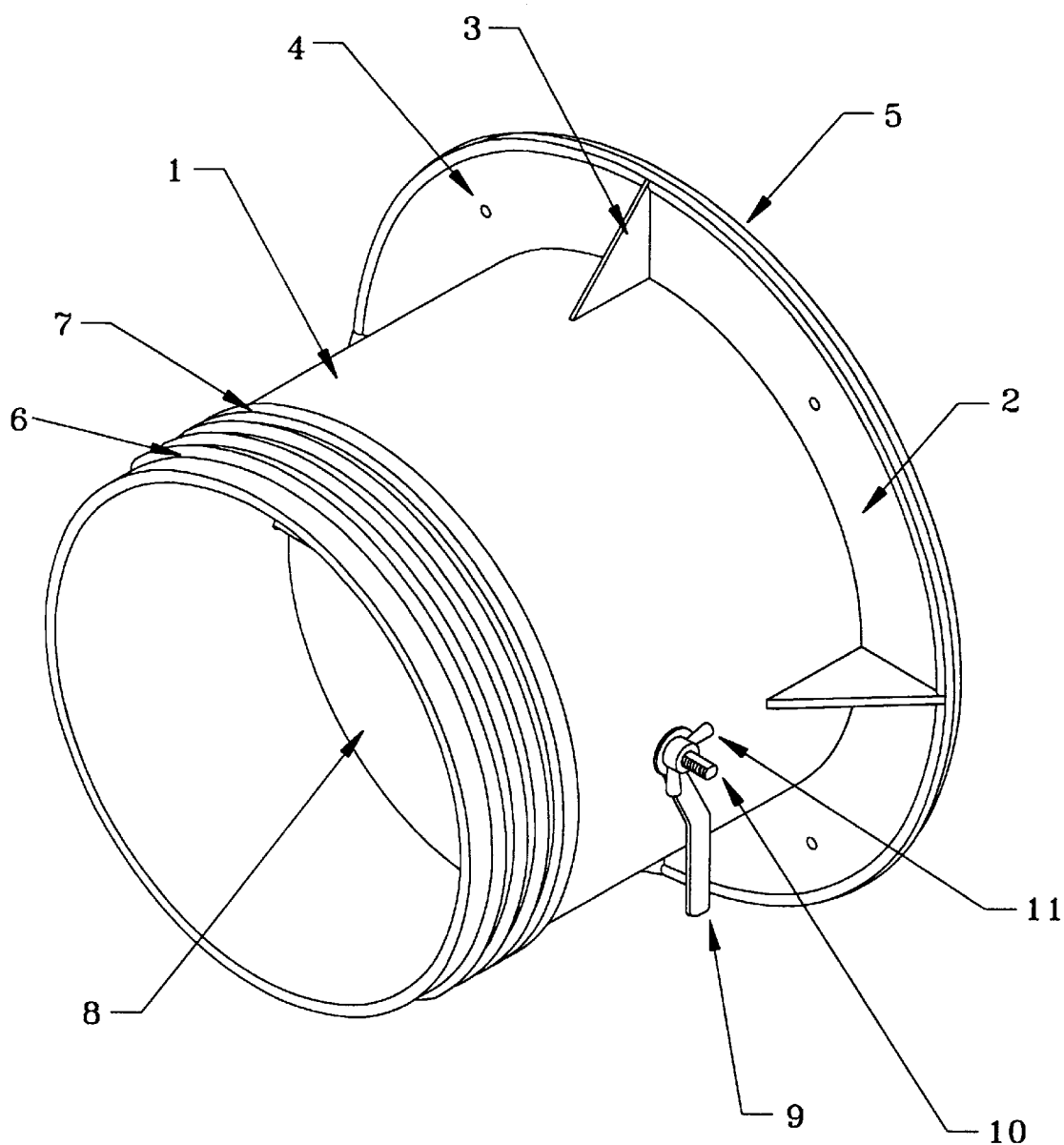
FIG. 1 is a perspective view of the take-off collar with the damper in place of the present invention.

The instant invention is a molded tubular member 1 having a passageway with an outwardly extending continuous peripheral flange portion 2 on one end perpendicular to the direction of elongation of the tubular member as illustrated in FIG. 1. The plastic material of construction is chosen based on cost, ease of molding, durability and engineering characteristics; ABS, PVC, polypropylene and fiberglass reinforced plastics may all be used. A plurality of openings 4 extend through the flange 2, generally parallel to the direction of elongation of the tubular member 1 adapted to have fastening members (not shown) pass therethrough for connection to the main duct (not shown).

A plurality of ribs are a part of the molded integrated structure at the junction of the tubular member 1 and the flange 2 for reinforcement and strengthening thereof. In conventional devices, this is normally one of the weakest links in the structure. To further strengthen the flange, a molded peripheral bead 15 is formed. At the other end of the tubular member 1, gripping beads 6 and a stopping edge 7 are formed therearound on its external surface adapted to allow easy connection with ductwork hosing of a branch duct (not shown).

Figure 3:
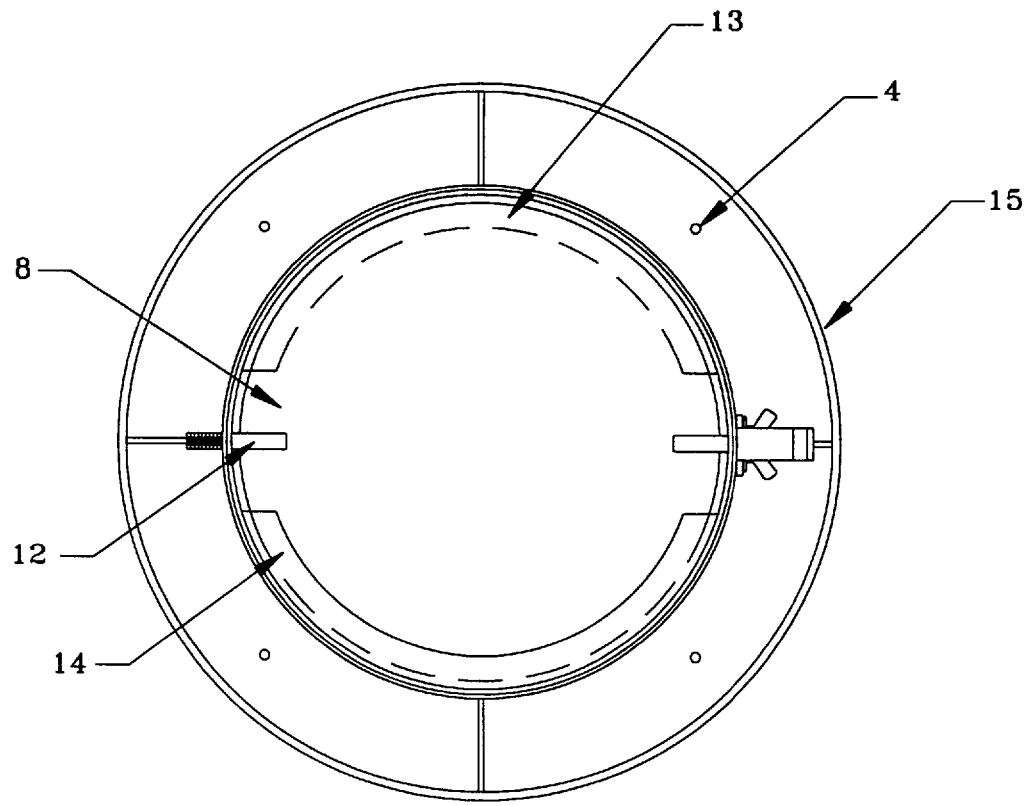
FIG. 3 is a front view of the take-off collar.
Figure 4:
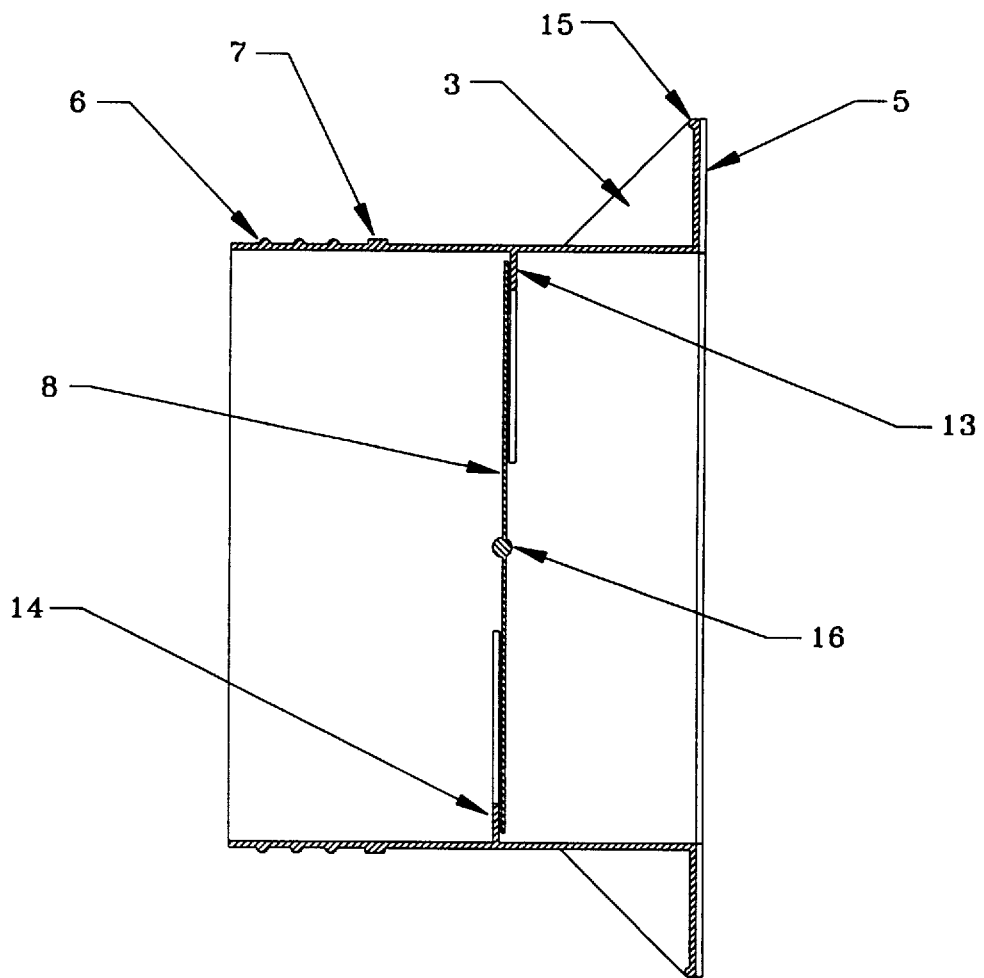
FIG. 4 is a cross sectional side view of the take-off collar illustrating the flap pivot point of the damper seated on the stopping rims.

As seen in FIG. 3 and 4, internally within the passageway, a pair of top and bottom interior, annular, truncated rim members, a front rim 13 and a rear rim 14, are molded perpendicularly therein for seating and stopping rotation of a damper. These rims 13,14 are horizontally displaced from one another adapted to allow the damper to seat on the top of one rim and the bottom of the other and further having space therebetween to accommodate the damper and its fixtures. The damper, of course, is a separate element which may or may not be necessary depending on the layout of the ductwork system and which will be used only where there is a need to close off the air flow or to divert it in another direction. The tubular member 1 has a first through aperture 16 formed therein spaced from both ends thereof, and a second through aperture 16 formed in the tubular member 1 on the same horizontal plane as the first aperture 16 and opposite therefrom and situated therebetween the truncated rim members 13,14 for receiving pivot pins 10 of the damper.

The assemblage is completed by installing a separate ring 5 or gasket of flexible material having adhesive on both sides thereof for bonding to the flange 2 and the main duct for joining together the integrated connecting component and the main duct, and the ring 5 having openings therein registered with the openings 4 of the flange adapted to have the fastening members pass therethrough. The ring 5 of flexible material is selected from the group consisting of foam tape, rubber and tacky cork, or any other suitable material for the application.

Figure 2:
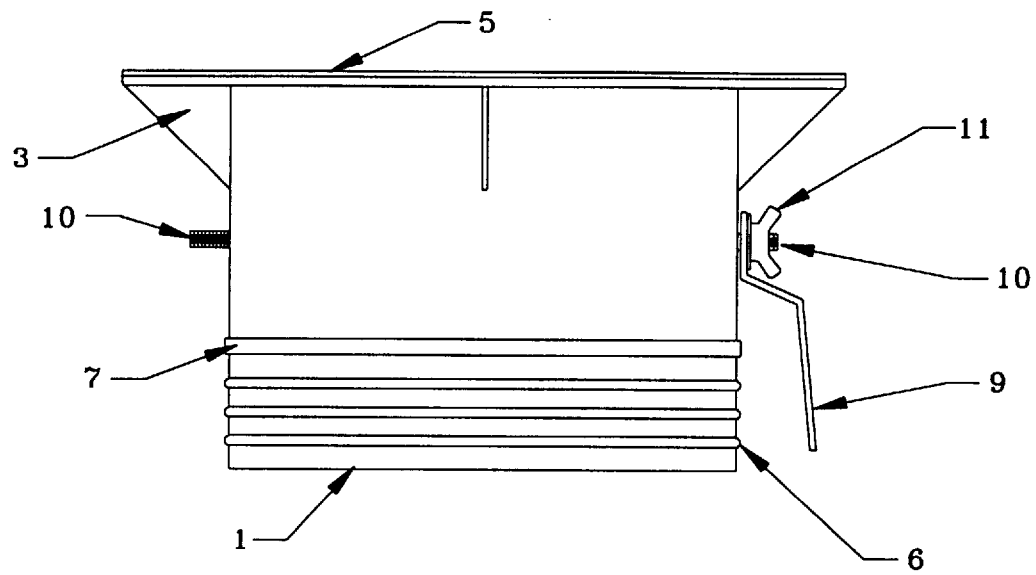
FIG. 2 is a top view of the take-off collar.

The damper, as seen in FIG. 2, is pivotally mounted in the air duct, the passageway of tubular member 1. The damper is normally one of the more troublesome elements of conventional take-off collars. Typically, it is known to mount a flat circular damper plate or blade in a cylindrical duct by attaching damper clips on diametrically opposite sides of the damper blade and by extending threaded pivot pins outwardly from those clips through the side walls of the duct. Such a damper was adjusted to a proper angle in the duct so as to get the desired amount of air flow through it. It was then fixedly positioned with respect to the duct by turning butterfly nuts down on the threaded pivot pins to clamp the inner face of the duct up against the damper clips. This assemblage has a number of parts all contributing to the assembly and installation of the damper, and consequently to its total cost.

Certainly, there have been available dampers wherein the circular plate or blade, though made of sheet metal, could be bent to allow installation of their protrusions into holes or slots in the tubing sidewall. However, bending sheet metal which does not have the memory of plastic results in worsening air leakage problems.

In the instant invention, the damper itself consists of a single generally flat molded flexible flap 8 having an outer periphery generally congruent with the inner periphery of the tubular member 1 on a plane normal to the longitudinal axis of the tubular member 1; a pair of protruding threaded pivot pins 10 molded to the flexible flap 8, having integrally molded reinforcements therefor 12, the flap 8 pivotable about a horizontal axis of the tubular member 1 of the take-off collar, a first pivot pin 10 having been inserted into the first through aperture 16 formed therein spaced from ends of the tubular member 1, and the flap 8 having been flexed, a second pivot pin 16 being inserted into a second through aperture 16 formed in the tubular member 1 on the same horizontal plane as the first aperture 16 and opposite thereto, the apertures 16 being positioned to allow placement of the pivot pins 10 therein; the longitudinal axes of each of the pivot pins 10 lies on a pivot axis constituted as a line lying on a diameter of the circular flap 8.; a handle 9 with an opening therein for placement on either one of the pivot pins 10 for moving the flap 8 ; and a wing nut 11 screwed onto the pivot pin 10 having the handle 9 thereon, for locking and unlocking the flap 8 in place to control air flow. After the damper is installed in the duct, pivot pins 10 extend through openings 16 provided in the wall of the tubular member 1.

Although the damper flap 8 disclosed herein is circular in order to closely conform to the internal side wall of tubular member 1, this invention is equally applicable to flaps of other shapes such as rectangular, oval, etc.

In the prior art any shifting whatever of the parts of the damper assembly results in a less than perfect alignment of the pivot pins and this has, in the past, caused an unacceptable number of rejects. Because of the deformation of metal which is involved in the damper blade, such rejects result in the complete discarding of the rejected pieces. Plastic, integrated, and molded devices are not susceptible to this problem.

What the present invention has accomplished, among other things, is the production of a damper blade which provides an infallible means for assuring that permanent integral pivot pins on both ends of a diametrical pivot axis of a circular damper will be accompanied by their precise positioning in the passageway of the take-off collar.

There are a number of advantages of this invention with its one piece molded plastic construction which is not just its ease of fabrication. It can be used with or without the damper flap, the flap being more useful where peopleneed to control air flow. The tight tolerances achieved with the molded construction both of the integrated connecting component and of the damper guarantee that a minimum of cooled or heated air will be wasted, therefore, there is significant energy savings. The entire assemblage of plastic is stronger than the conventional sheet metal or metal/plastic configurations. The molded rims provide additional benefits; such rims cannot economically be fabricated in metal. The beaded edges also provide a much tighter connection due to their superior fit. Though of lesser importance, the heat transfer characteristics of plastic for this application are much better, there are superior sound attenuation benefits in locations near personnel, and, of course, it is non-corrosive.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A take-off collar for joining together a main and a branch duct in forced air heating, cooling, exhaust and ventilation systems comprising:

an integrated connecting component further comprising:
a molded elongated plastic tubular member having a passageway and having a first end with an outwardly extending continuous peripheral flange portion perpendicular to the direction of elongation of the tubular member and having a molded peripheral bead for stiffening, the flange having therein a plurality of openings extending therethrough generally parallel to the direction of elongation of the tubular member and adapted to have fastening members pass therethrough for connecting to the main duct, and a second end having gripping beads and a stopping edge
a plurality of molded ribs formed at the external junction of the tubular member and the flange for reinforcement and strengthening thereof;
a pair of top and bottom interior, annular, truncated rim members molded perpendicularly in the passageway for seating and stopping rotation of a damper, horizontally displaced from one another for allowing the damper to seat on the top of one rim and the bottom of the other and further having space therebetween to accommodate fixtures of the damper; and
the tubular member has a first through aperture formed therein spaced from both ends thereof, a second through aperture is formed in the tubular member on the same horizontal plane as the first aperture and opposite therefrom and situated therebetween the truncated rim members.

2. The take-off collar of claim 1 further comprising a separate ring of flexible material having adhesive on both sides thereof for bonding to the flange and the main duct for joining together the integrated connecting component and the main duct, and the ring having openings therein registered with the openings of the flange adapted to have the fastening members pass therethrough.

3. The ring of claim 2 wherein the flexible material is selected from the group consisting of foam tape, rubber and tacky cork.

4. The take-off collar of claim 1 wherein the damper further comprises:
a generally flat molded flexible flap having an outer periphery generally congruent with the inner periphery of the tubular member on a plane normal to the longitudinal axis of the tubular member;

a pair of protruding threaded pivot pins molded to the flexible flap, having integrally molded reinforcements therefor, the flap pivotable about a horizontal axis of the tubular member of the take-off collar, a first pivot pin having been inserted into the first through aperture formed therein spaced from ends of the tubular member, and the flap having been flexed, a second pivot pin being inserted into a second through aperture formed in the tubular member on the same horizontal plane as the first aperture and opposite thereto, the apertures being positioned to allow placement of the pivot pins therein;

a handle with an opening therein for placement on either one of the pivot pins for moving the flap; and a wing nut screwed onto the pivot pin having the handle thereon, for locking and unlocking the flap in place to control air flow.

5. The integrated connecting component of claim 1 wherein the moldable material of construction is selected from the group consisting of moldable plastics and fiberglass reinforced plastics.

6. The integrated connecting component of claim 1 wherein the annular rim members are of a minimum width to insure maximum uninterrupted air flow while adequately stopping rotation of the damper.

7. The integrated connecting component of claim 1 wherein the outwardly extending continuous peripheral flange portion is not exactly perpendicular to the direction of elongation of the tubular member, having a radius of curvature sufficient to optimize air flow.

8. The damper of claim 4 wherein the damper flap is of a shape other than circular to conform to the internal side wall of the tubular member.

* * * * *